(12) United States Patent
Niepceron et al.

(10) Patent No.: US 11,022,045 B2
(45) Date of Patent: Jun. 1, 2021

(54) MECHANICAL REDUCTION GEAR FOR AN AIRCRAFT TURBOMACHINE

(71) Applicant: SAFRAN TRANSMISSION SYSTEMS, Colombes (FR)

(72) Inventors: Clément Paul René Niepceron, Moissy-Cramayel (FR); Boris Pierre Marcel Morelli, Moissy-Cramayel (FR); Marc Dominique Seyfrid, Moissy-Cramayel (FR); Simon Loïc Clément Lefebvre, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 16/922,351

(22) Filed: Jul. 7, 2020

(65) Prior Publication Data
US 2021/0010427 A1    Jan. 14, 2021

(30) Foreign Application Priority Data

Jul. 8, 2019   (FR) ...................................... 1907610

(51) Int. Cl.
*F16H 1/28*        (2006.01)
*F02C 7/36*        (2006.01)
*F16H 57/00*       (2012.01)
*F16H 57/08*       (2006.01)

(52) U.S. Cl.
CPC ................. *F02C 7/36* (2013.01); *F16H 1/28* (2013.01); *F16H 57/0025* (2013.01); *F16H 57/08* (2013.01); *F05D 2220/323* (2013.01)

(58) Field of Classification Search
CPC .......... F02C 7/36; F16H 57/0025; F16H 1/28; F16H 57/08; F05D 2220/323
See application file for complete search history.

(56) References Cited

U.S. PATENT DOCUMENTS

| 2,684,591 A | * | 7/1954 | Lundquist ................. F16H 1/28 |
| | | | 73/862.31 |
| 4,583,413 A | * | 4/1986 | Lack ...................... F16H 1/2809 |
| | | | 475/159 |
| 5,433,674 A | | 7/1995 | Sheridan et al. |

(Continued)

FOREIGN PATENT DOCUMENTS

FR    2 987 416 A1    8/2013
FR    3 041 054 A1    3/2017

(Continued)

OTHER PUBLICATIONS

Rapport De Recherche Preliminaire dated Mar. 20, 2020, for French Application No. 1907610, filed Jul. 8, 2019, 2 pages.

*Primary Examiner* — Justin Holmes
(74) *Attorney, Agent, or Firm* — Christensen O'Connor Johnson Kindness PLLC

(57) ABSTRACT

A mechanical reduction gear is suitable for a turbomachine and, in particular, a turbomachine of an aircraft. The reduction gear includes a sun gear, a ring gear formed by two half-ring gears, planet gears arranged between the sun gear and the ring gear, and at least one shaft rotationally fixed to the ring gear. The reduction gear further includes an annular covering part that extends around the ring gear and is independently fixed by flanges and/or splines to each of the half-ring gears.

16 Claims, 3 Drawing Sheets

(56) References Cited

U.S. PATENT DOCUMENTS

| | | | |
|---|---|---|---|
| 6,223,616 | B1 | 5/2001 | Sheridan |
| 7,685,808 | B2 * | 3/2010 | Orlando ................. F02K 3/072 60/268 |
| 8,740,740 | B2 * | 6/2014 | McCune ............. F16H 57/0486 475/159 |
| 8,820,478 | B2 | 9/2014 | Gauthier et al. |
| 8,876,647 | B2 | 11/2014 | Gallet et al. |
| 10,458,279 | B2 | 10/2019 | Gedin et al. |
| 2008/0098716 | A1 | 5/2008 | Orlando et al. |
| 2016/0201791 | A1 | 7/2016 | Curlier et al. |

FOREIGN PATENT DOCUMENTS

| | | |
|---|---|---|
| WO | 2010/092263 A1 | 8/2010 |
| WO | 2015019025 A1 | 2/2015 |

\* cited by examiner

MECHANICAL REDUCTION GEAR FOR AN AIRCRAFT TURBOMACHINE

CROSS REFERENCE TO RELATED APPLICATION

This application claims priority under 35 U.S.C. § 119 to French Patent Application No. 1907610, filed Jul. 8, 2019, which is herein incorporated by reference in its entirety.

FIELD

The present disclosure concerns a mechanical reduction gear for a turbomachine, in particular for an aircraft.

BACKGROUND

The background comprises in particular documents US-A1-2008/098716, U.S. Pat. Nos. 6,223,616, 4,433,674, WO-A1-2015/019025, WO-A1-2010/092263, FR-A1-2 987 416 and FR-A1-3 041 054.

The role of a mechanical reduction gear is to change the speed ratio and torque between the input shaft and the output shaft of a mechanism.

The new generations of dual-flow turbomachines, in particular those with a high dilution ratio, comprise a mechanical reduction gear to drive the shaft of a fan. Usually, the purpose of the reduction gear is to transform the so-called fast rotation speed of the shaft of a power turbine into a slower rotation speed for the shaft driving the fan.

Such a reduction gear comprises a central pinion, called the sun gear, a ring gear, and pinions called planet gears, which are meshed between the sun gear and the ring gear. The planet gears are held by a frame called a planet carrier. The sun gear, the ring gear and the planet carrier are planetary gears because their axes of revolution coincide with the longitudinal axis X of the turbomachine. The planet gears each have a different axis of revolution equally distributed on the same operating diameter around the axis of the planetary gears. These axes are parallel to the longitudinal axis X.

There are several reduction gear architectures. In the prior art of dual-flow turbomachines, the reduction gears are of the planetary or epicyclic type. In other similar applications, there are so-called differential or "compound" architectures.

- on a planetary reduction gear, the planet carrier is fixed and the ring gear constitutes the output shaft of the device which rotates in the opposite direction to the sun gear direction.
- on an epicyclic reduction gear, the ring gear is fixed and the planet carrier constitutes the output shaft of the device which rotates in the same direction as the sun gear one.
- on a compound reduction gear, no element is fixed in rotation. The ring gear rotates in the opposite direction to the sun gear and the planet carrier.

The reduction gear can consist of one or more meshing stages. This meshing is achieved in different ways such as contact, friction or magnetic field.

There are several types of contact meshing, such as straight or herringbone toothing meshing.

In the case of herringbone toothing meshing, the ring gear is usually formed by two coaxial half-ring gears, each of which comprises, on its inner periphery, teeth of the toothing and, on its outer periphery, fastening flanges for attaching in particular to a shaft when the ring gear is movable in rotation. The teeth are carried by annular rims which are connected to the flanges by frustoconical webs.

A disadvantage of this technology is its size. In particular, the radial dimensions of the assembly and the fastening method of the half-ring gears have a significant impact on the radial dimensions of the reduction gear as a whole.

The present disclosure proposes an improvement to this technology, which is simple, efficient and economical.

SUMMARY

The present disclosure concerns a mechanical reduction gear for a turbomachine, in particular for an aircraft, comprising:
- a central sun gear of axis X of rotation,
- a ring gear extending around the axis X and the sun gear and comprising a herringbone toothing, the ring gear being formed by two coaxial half-ring gears which are spaced apart from each other by an annular space and which each comprise teeth of the toothing, the ring gear being rotatable around said axis X,
- planet gears disposed between the sun gear and the ring gear and supported by a planet carrier immobile in rotation around said axis X,
- at least one shaft rotationally fixed to the ring gear,
- an annular covering part which extends around said space and at least one portion of the ring gear, this part being independently fixed flanges and/or splines to each of the half-ring gears, characterized in that the ring gear is rotationally fixed to two shafts extending respectively on each side of the reduction gear.

The present disclosure thus proposes a new technology for assembling and fixing half-ring gears. It thus makes it possible to remove the prior art's webs which have a large dimension in the radial direction. Each half-ring gear is made rotationally fixed to the covering part by fastening means which are independent of the fastening means for fastening this part to the other half-ring gear. These fastening means are with flanges and/or splines.

The ring gear is rotationally fixed to two separate shafts by means of the intermediate covering part, which makes it possible to ensure this connection in a simple manner and with a reduced space requirement.

The ring gear of the reduction gear can be rotationally fixed to a fan shaft and a turbine shaft of the turbomachine. The reduction gear according to the present disclosure can be integrated, for example, into a turbomachine with a counter-rotating turbine.

The reduction gear according to the present disclosure may comprise one or more of the following features, taken in isolation from one another or in combination with one another:

- the covering part extends between the two shafts, or covers a portion of the two shafts, or is formed integrally with one of the shafts;
- the covering part comprises first splines for coupling to one of the half-ring gears and second splines for coupling to the other of the half-ring gears, the half-ring gears being clamped axially against each other and against an element of the covering part by means of a nut screwed into or onto the covering part;
- one of the half-ring gears is formed integrally with one of the shafts, and the other of the half-ring gears is formed integrally with the other shaft;

the covering part is formed integrally with one of the shafts, and further comprises third splines for coupling to the other shaft;

the ring gear is free of fastening flanges;

the covering part comprises a cylindrical wall connected at each of its axial ends to a radial flange, a first one of the radial flanges of the covering part being fixed to a radial flange of one of the half-ring gears, and a second one of the radial flanges of the covering part being fixed to a radial flange of the other half-ring gear;

the flange of one of the half-ring gears is clamped between the flange of the covering part and a radial flange of one of the shafts, and the flange of the other half-ring gear is clamped between the flange of the covering part and a radial flange of the other shaft;

each half-ring gear comprises an annular rim having a generally parallelepipedal shape in axial section, the rim comprising the teeth at its inner periphery and an outer cylindrical surface at its outer periphery, this surface being surrounded with little or no clearance by the covering part;

said part has a radial thickness which varies, and in particular increases, from one axial end to an opposite axial end; this makes it possible in particular to optimise the rigidity of the part as a function in particular of the forces applied to the teeth of the half-ring gears during operation, in order to avoid their misalignment with respect to the complementary teeth of the planet gears.

The present disclosure also concerns a turbomachine, in particular for an aircraft, comprising a reduction gear as described above.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

Other characteristics and advantages of the disclosed subject matter will appear during the reading of the detailed description that will follow, for the understanding of which reference shall be made to the attached drawings in which.

DETAILED DESCRIPTION

Figure 1:
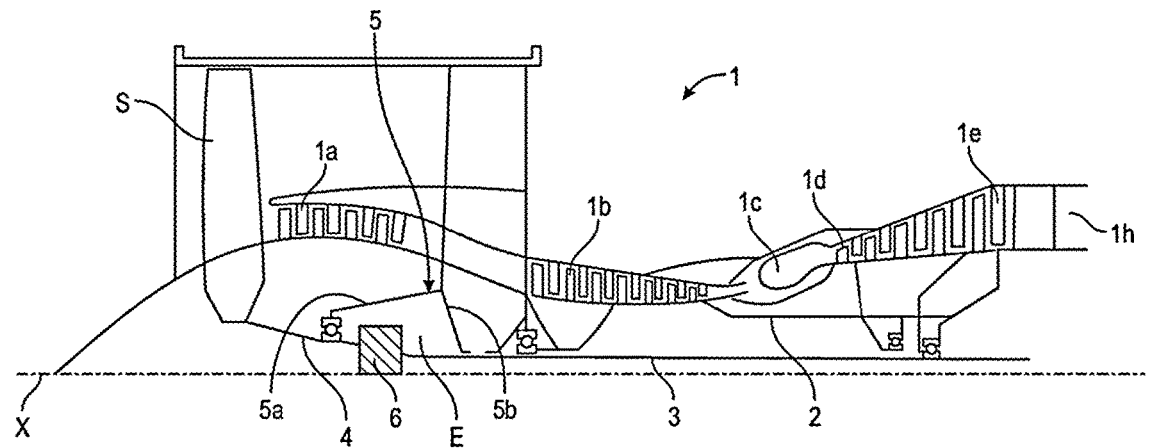
FIG. 1 is a schematic axial section view of a turbomachine with a first exemplary embodiment of a mechanical reduction gear according to the present disclosure.

FIG. 1 describes a turbomachine 1 which conventionally comprises a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and form with it a high-pressure (HP) body. The low-pressure compressor 1a and the low-pressure turbine 1e are connected by a low-pressure shaft 3 and form with it a low-pressure body (LP).

The fan S is driven by a fan shaft 4 which is connected to the LP shaft 3 by means of a reduction gear 6. This reduction gear is usually of the planetary or epicyclic type.

The following description and the present invention relate more specifically to a reduction gear of the planetary type.

The reduction gear 6 is positioned in the upstream or downstream part of the turbomachine, in relation to the general direction of the gases within the turbomachine. A fixed structure comprising schematically, here, an upstream portion 5a and a downstream portion 5b which makes up the engine casing or stator 5 is arranged so as to form an enclosure E surrounding the reduction gear 6. Here, this enclosure E is closed upstream by seals at a bearing level allowing the fan shaft 4 to pass through, and downstream by seals at the level of the passage of the LP shaft 3.

Figure 2:
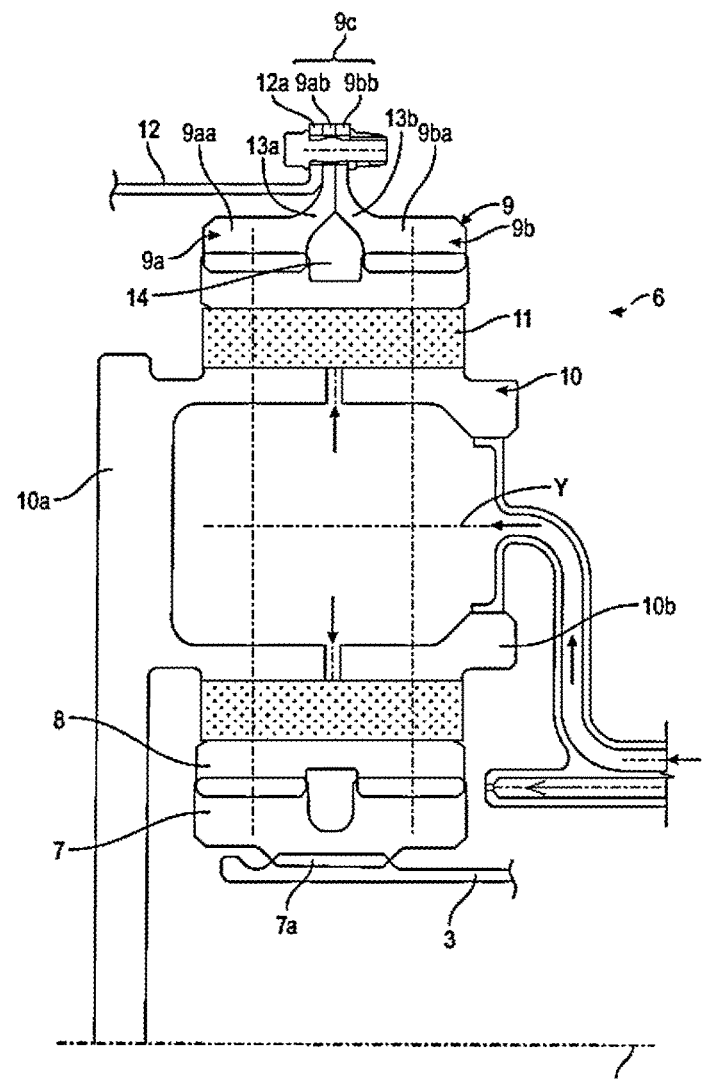
FIG. 2 is a partial schematic axial section view of a known mechanical reduction gear.

FIG. 2 shows a portion of the reduction gear 6. In the input side, the reduction gear 6 is connected to the LP shaft 3, e.g. via splines 7a. Thus, the LP shaft 3 drives a planetary gear called the sun gear 7. Classically, the sun gear 7, whose axis of rotation is the same as the axis X of the turbomachine, drives a series of pinions called planet gears 8, which are evenly distributed on the same diameter around the axis X of rotation. This diameter is equal to twice the operating centre distance between sun gear 7 and planet gears 8. The number of planet gears 8 is generally defined between three and eight for this type of application.

All planet gears 8 are held by a frame called planet carrier 10. Each planet gear 8 rotates around its own axis Y and meshes with the ring gear 9.

At the output of the reduction gear, in this planetary configuration, all planet gears 8 are held by a planet carrier 10 which is fixed to the engine casing or stator 5. Each planet gear drives the ring gear which is connected to the fan shaft 4 via a ring gear carrier 12.

Each planet gear 8 is freely rotatably mounted by means of a bearing 11, e.g. a rolling or hydrostatic bearing. Each bearing 11 is mounted on one of the axes 10b of the planet carrier 10 and all axes are positioned relative to each other by means of one or more structural frames 10a of the planet carrier 10. There is a number of axes and bearings equal to the number of planet gears. For operational, mounting, manufacturing, testing, repair or spare parts reasons the axes 10b and the frame 10a can be separated into several parts.

For the same reasons mentioned above, the toothing of a reduction gear may be a herringbone toothing and formed by two coaxial annular rows of teeth, the teeth of the first row having an opposite helix angle to the teeth of the second row.

The ring gear 9 comprises a herringbone toothing and is formed by two half-ring gears:

an upstream half-ring gear 9a comprising a rim 9aa and a fastening flange 9ab which are connected to one another by a truncated cone-shaped web 13a. The rim 9aa comprises at its inner periphery the front helix or teeth of the toothing of the reduction gear. This front helix meshes with that of the planet gear 8 which meshes with that of the sun gear 7. The web 13a extends radially outwards at the outer periphery of the rim 9aa. The flange 9ab extends in a plane perpendicular to the axis X.

a downstream half-ring gear 9b consisting of a rim 9ba and a fastening flange 9bb which are connected to each other by a truncated cone-shaped web 13b. The rim 9ba comprises at its inner periphery the helix or the rear teeth of the toothing of the reduction gear. This downstream helix meshes with that of the planet gear 8 which meshes with that of the sun gear 7. The web 13a extends radially outwards at the outer periphery of the rim 9ba. The flange 9bb extends in a plane perpendicular to the axis X.

The fastening flange 9ab of the front ring gear 9a and the fastening flange 9bb of the rear ring gear 9b form the fastening flange 9c of the ring gear. This flange 9c extends perpendicularly to an annular space 14 located between the half-ring gears 9a, 9b or rather between the rims 9aa, 9ba. The ring gear 9 is fixed to the ring gear carrier 12 by assembling the fastening flange 9c of the ring gear and the fastening flange 12a of the ring gear carrier using a bolted assembly for example.

The arrows in FIG. 2 describe the oil flow in reduction gear 6 for the lubrication of the individual parts and gearwheels of the reduction gear.

The technology of FIG. 2 represents the art prior to the present invention and has a disadvantage related to the large dimensions, in particular radial, of its ring gear 9.

The present invention proposes to modify the method of assembly of the ring gear in order, in particular, to be able to eliminate the aforementioned webs.

Figure 3:
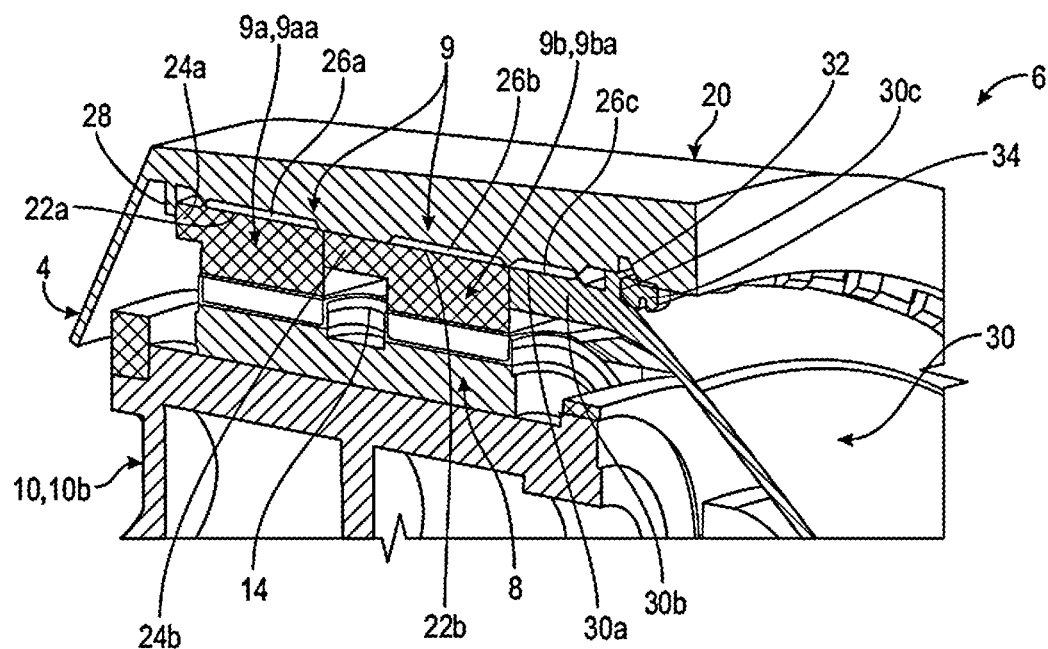
FIG. 3 is a schematic axial section and perspective view of a part of the mechanical reduction gear, shown in FIG. 1.
Figure 4:
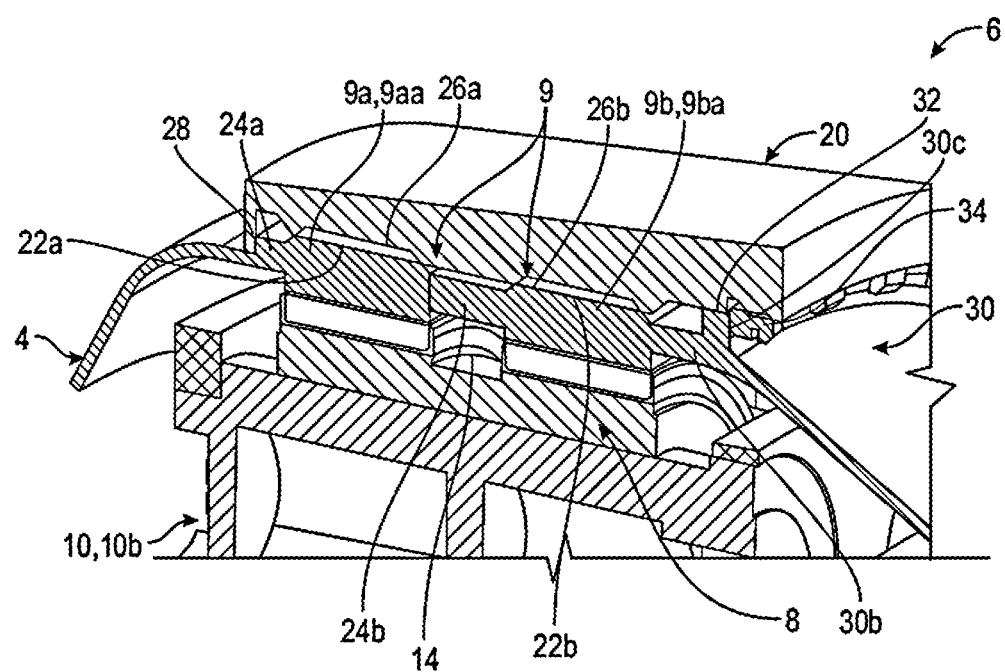
FIG. 4 is a schematic axial section and perspective view of a portion of a second representative embodiment of the mechanical reduction gear shown in FIG. 1.
Figure 5:
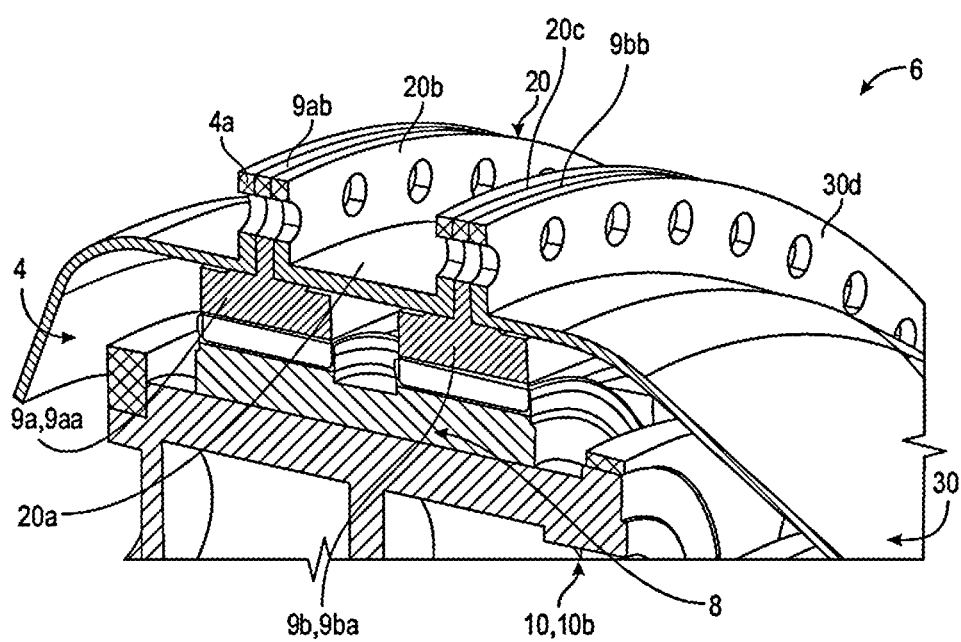
FIG. 5 is a schematic axial section and perspective view of a portion of a third representative embodiment of the mechanical reduction gear shown in FIG. 1.

FIGS. 3 to 5 illustrate alternative embodiments in which the elements already described in the foregoing are designated by the same reference numbers.

These variants have at least one point in common linked to the use of an annular covering part 20 to ensure the assembly of the ring gear 9 and in particular its half-ring gears 9a, 9b. The part 20 extends around the inter-ring gear or inter-rim space 14 and at least part of the ring gear 9, and is fixed independently by flanges and/or splines to each of the half-ring gears 9a, 9b.

In the embodiment of FIG. 3, the half-ring gears 9a, 9b are without flanges. Each rim 9aa, 9ba comprise teeth on its inner periphery and splines 22a, 22b on its outer periphery. In particular, these splines may be in involute of circle with centering at the head. Each rim 9aa, 9ba may additionally comprise a cylindrical front edge 24a, 24b.

The covering part 20 has a general cylindrical shape and extends around the half-ring gears 9a, 9b. The covering part 20 has its upstream end connected to fan shaft 4. As in the example shown, the part 20 and shaft 4 could be formed as a single part. The shaft 4 extends upstream from the reduction gear 6 and is therefore located on the upstream side of the reduction gear.

The part 20 comprises, on its inner periphery, splines 26a for coupling to splines 22a, and splines 26b for coupling to splines 22b. The splines 26a, 26b may be combined or extend in line with each other.

Upstream of splines 26a, 26b, the part 20 comprises a radially inner annular edge 28 which forms an axial support for the upstream edge 24a of the upstream half-ring gear 9a. The upstream edge 24b of the downstream half-ring gear 9b rests on a downstream annular face of the upstream half-ring gear 9a.

Downstream of the splines 26a, 26b, the part 20 comprises splines 26c for coupling with complementary splines 30a of another shaft 30 of the turbomachine. The shaft 30 extends downstream from the reduction gear 6 and is therefore located on the downstream side of the reduction gear. By way of non-limiting example, if the turbomachine is of the above-mentioned type and shown in FIG. 1, the shaft 30 would be connected to the low-pressure body.

Alternatively, in the case of a turbomachine with a reduction gear placed on the downstream side of the turbomachine, the shaft 4 could be connected to a turbine rotor, and the shaft 30 could be connected to the fan disc.

Here the splines 30a are located on an upstream cylindrical portion 30b of the shaft 30, the upstream end of which rests on a downstream annular face of the rear half-ring gear 9b. This portion 30b comprises a downstream radial face 30c downstream of the splines 30a which can be defined by an outer annular edge 32 of this portion 30b.

Downstream of the splines 26a, 26b, 26c, the part 20 further comprises an internal thread for screwing a nut 34 which is supported axially on the face 30d. It is therefore understandable that the half-ring gears 9a, 9b as well as the portion 30b of the shaft 30 in the example shown are clamped axially against each other and against the edge 28 by screwing and clamping the nut 34.

In the absence of the shaft 30, the nut 34 can be screwed on and supported directly on the downstream face of the rear half-ring gear 9b.

FIG. 3 shows that a relatively small radial clearance is present between the part 20 and the rims 9ab, 9bb of the half-ring gears 9a, 9b. It can also be seen that the rigidity of the part can be adapted to avoid misalignment of the toothing during operation. In the example shown, the radial thickness of the part 20 varies and in particular increases from its upstream end to its downstream end in order to stiffen this downstream end.

In the embodiment shown in FIG. 4, the half-ring gears 9a, 9b are without flanges. Each rim 9aa, 9ba comprises toothing teeth on its inner periphery and straight splines 22a, 22b on its outer periphery. Each rim 9aa, 9ba may additionally comprise an upstream cylindrical edge 24a, 24b.

The covering part 20 has a generally cylindrical shape and extends around the half-ring gear 9a, 9b.

In the example shown, the upstream half-ring gear 9a is connected to the shaft 4, in particular by its edge 24a, and can be formed in one part with the shaft 4. The shaft 4 extends upstream from the reduction gear 6 and is therefore located on the upstream side of the reduction gear.

The downstream half-ring gear 9b is connected to the shaft 30 and can be formed in one part with the shaft 30. The shaft 30 extends downstream from the reduction gear 6 and is therefore located on the downstream side of the reduction gear.

If the turbomachine comprises an intermediate turbine (between the high-pressure and low-pressure turbines), the shaft 30 can be connected to the rotor of this intermediate turbine. The part 20 comprises, on its inner periphery, splines 26a for coupling to splines 22a, and splines 26b for coupling to splines 22b. The splines 26a, 26b can be combined or extend in line with each other.

Upstream of the splines 26a, 26b, the part 20 comprises a radially inner annular edge 28 which forms an axial support abutment for the upstream edge 24a of the upstream half-ring gear 9a. The upstream edge 24b of the rear half-ring gear 9b is supported on a downstream annular face of the upstream half-ring gear 9a.

The portion 30b of the shaft 30 comprises a downstream radial face 30c which can be defined by an outer annular edge 32 of this portion 30b.

Downstream of the splines 26a, 26b, 26c, the part 20 comprises an internal thread for screwing a nut 34 which is supported axially on the face 30d. It is therefore understandable that the half-ring gears 9a, 9b are clamped axially against each other and against the edge 28 by screwing and clamping the nut 34.

FIG. 4 also shows that there is a relatively small radial clearance between the part 20 and the rims 9ab, 9bb of half-ring gears 9a, 9b. It can also be seen that the rigidity of the part can be adapted to avoid misalignment of the toothing during operation. In the example shown, the radial thickness of the part 20 varies and in particular increases from its front end to its rear end in order to stiffen the latter.

In the embodiment shown in FIG. 5, the half-ring gears 9a, 9b are equipped with radial flanges 9ab, 9bb without webs for connecting to their rims 9aa, 9ba. Each rim 9aa, 9ba comprises toothing teeth on its inner periphery and the radial flange 9ab, 9bb on its outer periphery.

The covering part 20 comprises a cylindrical wall 20a which is connected at each of its axial ends to a radial flange 20b, 20c. The part 20 is here without coupling splines.

The wall 20a extends between the flanges 9ab, 9bb of the ring gear and directly around the rims 9aa, 9ba, preferably without clearance or with little clearance in the radial direction. The upstream flange 20b of the part 20 is applied axially against the flange 9ab of the upstream half-ring gear 9a. The downstream flange 20c of the part 20 is axially pressed against the flange 9bb of the downstream half-ring gear 9b.

The shaft 4 extends upstream from the reduction gear 6 and is therefore located on the upstream side of the reduction gear. The shaft 4 comprises a radial flange 4a for attachment to flanges 9ab, 20b. The flanges 4a, 9ab, 20b comprise through holes for the passage of screw/nut or similar fastening means (not shown).

The shaft 30 extends downstream from the reduction gear 6 and is therefore located on the downstream side of the reduction gear. The shaft 30 comprises a radial flange 30d for attachment to the flanges 9bb, 20c. The flanges 30d, 9bb, 20c comprise through holes for the passage of screw/nut or similar fastening means (not shown).

As mentioned above, the reduction gear 6 according to the invention can be integrated into a turbomachine with counter-rotating turbine.

In particular, the invention makes it possible to obtain the smallest possible radial dimensions, while complying with the following constraints:
  the assembly of the half-ring gears must allow the transmission of torque from the planet gears to the shaft,
  the assembly must keep the half-ring gears in position with each other (radial and angular positioning), and
  the assembly must maintain the engagement of the toothing of the ring gear.

While illustrative embodiments have been illustrated and described, it will be appreciated that various changes can be made therein without departing from the spirit and scope of the invention.

The embodiments of the invention in which an exclusive property or privilege is claimed are defined as follows:

1. A reduction gear for a turbomachine, comprising:
  a central sun gear having an axis X of rotation;
  a ring gear extending around said axis X and around said central sun gear and comprising a herringbone toothing, said ring gear being formed by two coaxial half-ring gears that are spaced apart from each other by an annular space and that each comprise teeth of said toothing, said ring gear being rotatable around said axis X;
  planet gears disposed between said central sun gear and said ring gear and supported by a planet carrier which is immobile in rotation about said axis X;
  at least one shaft rotationally fixed to said ring gear; and
  an annular covering part that extends around said annular space and at least one portion of said ring gear, said covering part being fixed to each of said two coaxial half-ring gears by at least one of flanges and splines,
  wherein said ring gear is rotationally fixed to two shafts extending respectively on each side of the reduction gear.

2. The reduction gear according to claim 1, wherein said covering part at least one of:
  extends between said two shafts;
  covers a portion of said two shafts; and
  is formed integrally with one of said two shafts.

3. The reduction gear according to claim 1, wherein said covering part comprises first splines for coupling to one of said two coaxial half-ring gears, and second splines for coupling to the other of said two coaxial half-ring gears, said two coaxial half-ring gears being clamped axially against each other and in axial abutment against a abutment of said covering part by means of a nut screwed into or onto said covering part.

4. The reduction gear according to claim 3, wherein one of said two coaxial half-ring gears is formed integrally with one of said two shafts and the other of said two coaxial half-ring gears is formed integrally with the other of said two shafts.

5. The reduction gear according to claim 3, wherein said covering part is formed integrally with one of said two shafts, and further comprises third splines for coupling to the other of said two shafts.

6. The reduction gear according to claim 3, wherein said ring gear is free of fastening flanges.

7. The reduction gear according to claim 1, wherein said covering part comprises a cylindrical wall connected at each of its axial ends to a radial flange, a first one of said radial flanges of said covering part being fixed to a radial flange of one of said two half-ring gears, and a second one of said radial flanges of said covering part being fixed to a radial flange of the other of said two half-ring gears.

8. The reduction gear according to claim 7, wherein said radial flange of one of said two half-ring gears is clamped between said first or second radial flange of said covering part and a radial flange of one of said two shafts, and said radial flange of the other half-ring gear is clamped between said radial flange of said covering part and a radial flange of the other of said two shafts.

9. The reduction gear according to claim 1, wherein each of said half-ring gears comprises an annular rim having a generally parallelepipedal shape in axial section, said annular rim comprising said teeth at its inner periphery and an outer cylindrical surface at its outer periphery, said outer cylindrical surface being surrounded with little or no clearance by said covering part.

10. A turbomachine comprising a reduction gear according to claim 1.

11. The turbomachine of claim 10, wherein said turbomachine is an aircraft turbomachine.

12. The turbomachine of claim 1, wherein said annular covering part extends entirely around said annular space.

13. A reduction gear for a turbomachine, comprising:
  a central sun gear having an axis X of rotation;
  a ring gear extending around the axis X and around said central sun gear, said ring gear comprising a herringbone toothing, said ring gear being formed by two coaxial half-ring gears that are spaced apart from each other by an annular space and that each comprises teeth of said herringbone toothing, said ring gear being rotatable around the axis X;

planet gears disposed between said central sun gear and said ring gear and supported by a planet carrier which is immobile in rotation about said axis X;

at least one shaft rotationally fixed to said ring gear; and an annular covering part that extends around said annular space and at least one portion of said ring gear, said covering part being fixed to each of said two coaxial half-ring gears by at least one of flanges and splines, wherein said ring gear is rotationally fixed to two shafts extending respectively on each side of the reduction gear, wherein said covering part comprises first splines for coupling to one of said two coaxial half-ring gears, and second splines for coupling to the other of said two coaxial half-ring gears, said two coaxial half-ring gears being clamped axially against each other and in axial abutment against a abutment of said covering part by means of a nut screwed into or onto said covering part, and wherein one of said two coaxial half-ring gears is formed integrally with one of said two shafts and the other of said two coaxial half-ring gears is formed integrally with the other of said two shafts.

14. A reduction gear for a turbomachine, comprising:

a central sun gear having an axis X of rotation;

a ring gear extending around the axis X and around said central sun gear, said ring gear comprising a herringbone toothing, said ring gear being formed by two coaxial half-ring gears that are spaced apart from each other by an annular space and that each comprises teeth of said herringbone toothing, said ring gear being rotatable around the axis X;

planet gears disposed between said central sun gear and said ring gear and supported by a planet carrier which is immobile in rotation about said axis X;

at least one shaft rotationally fixed to said ring gear; and an annular covering part that extends around said annular space and at least one portion of said ring gear, said covering part being fixed to each of said two coaxial half-ring gears by at least one of flanges and splines, wherein said ring gear is rotationally fixed to two shafts extending respectively on each side of the reduction gear, wherein said covering part comprises first splines for coupling to one of said two coaxial half-ring gears, and second splines for coupling to the other of said two coaxial half-ring gears, said two coaxial half-ring gears being clamped axially against each other and in axial abutment against a abutment of said covering part by means of a nut screwed into or onto said covering part, and wherein said covering part is formed integrally with one of said two shafts, and further comprises third splines for coupling to the other of said two shafts.

15. A reduction gear for a turbomachine, comprising:

a central sun gear having an axis X of rotation;

a ring gear extending around the axis X and around said central sun gear, said ring gear comprising a herringbone toothing, said ring gear being formed by two coaxial half-ring gears that are spaced apart from each other by an annular space and that each comprises teeth of said herringbone toothing, said ring gear being rotatable around the axis X;

planet gears disposed between said central sun gear and said ring gear and supported by a planet carrier which is immobile in rotation about said axis X;

at least one shaft rotationally fixed to said ring gear; and an annular covering part that extends around said annular space and at least one portion of said ring gear, said covering part being fixed to each of said two coaxial half-ring gears by at least one of flanges and splines, wherein said ring gear is rotationally fixed to two shafts extending respectively on each side of the reduction gear, and wherein said covering part comprises a cylindrical wall connected at each of its axial ends to a radial flange, a first radial flange of said covering part being fixed to a radial flange of one of said two half-ring gears, and a second radial flange of said covering part being fixed to a radial flange of the other of said two half-ring gear.

16. The reduction gear according to claim 15, wherein said radial flange of one of said two half-ring gears is clamped between said first or second radial flange of said covering part and a radial flange of one of said two shafts, and said radial flange of the other half-ring gear is clamped between said radial flange of said covering part and a radial flange of the other of said two shafts.

* * * * *